United States Patent
Kim et al.

(10) Patent No.: US 11,213,943 B2
(45) Date of Patent: Jan. 4, 2022

(54) MOVING ROBOT AND OPERATING METHOD FOR THE SAME

(71) Applicant: LG ELECTRONICS INC., Seoul (KR)

(72) Inventors: Yongjae Kim, Seoul (KR); Seunghee Kim, Seoul (KR); Junhee Yeo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 278 days.

(21) Appl. No.: 16/442,183

(22) Filed: Jun. 14, 2019

(65) Prior Publication Data

US 2019/0375094 A1 Dec. 12, 2019

(30) Foreign Application Priority Data

Jun. 14, 2018 (KR) .................. 10-2018-0067876

(51) Int. Cl.
*H04W 4/024* (2018.01)
*B25J 5/00* (2006.01)
*G05D 1/02* (2020.01)

(52) U.S. Cl.
CPC ............ *B25J 5/007* (2013.01); *G05D 1/0225* (2013.01); *G05D 1/0238* (2013.01); *H04W 4/024* (2018.02); *G05D 2201/02* (2013.01)

(58) Field of Classification Search
CPC .. G05D 1/0088; G05D 1/0212; G05D 1/0276; G05D 2201/0203; G05D 1/0214;
(Continued)

(56) References Cited

U.S. PATENT DOCUMENTS

2017/0123423 A1* 5/2017 Sako .................... G05D 1/0088
2019/0005545 A1* 1/2019 Roh .................... G06Q 30/0269
(Continued)

FOREIGN PATENT DOCUMENTS

KR 1020080056669 6/2008
KR 1020080090150 10/2008
(Continued)

OTHER PUBLICATIONS

Chung et al., Designing information gathering robots for human-populated environments, 2015, IEEE, pg. (Year: 2015).*
(Continued)

*Primary Examiner* — McDieunel Marc
(74) *Attorney, Agent, or Firm* — Lee, Hong, Degerman, Kang & Waimey PC

(57) ABSTRACT

A method of operating a robot includes providing position information about a destination; receiving a request for an escort service to the destination in response to the position information; determining whether the escort service is available based on information related to the destination, the information related to the destination including at least one of state information of the destination or time information related to the destination; causing the robot to move and provide guiding to the destination in response to the request when the escort service is available; and notifying that the escort service is not available when the escort service is not available.

19 Claims, 14 Drawing Sheets

(58) Field of Classification Search
CPC .. G05D 1/0238; G01C 21/3438; G01C 21/20; G01C 21/3664; G01C 21/3694; G01C 21/34; G08G 1/161; G08G 1/096872; G01S 13/931; B60W 2050/146; B61B 15/00; E01B 25/28; G06F 3/167; H04W 4/02; H04W 4/024; Y10S 901/01; A61G 2203/22; B62B 5/0069; G09F 21/00; B25J 11/008; B25J 9/161; B25J 5/007; G06Q 50/12; G06Q 50/10; G05B 2219/40202; G05B 2219/40411; G05B 2219/50391

See application file for complete search history.

(56) References Cited

U.S. PATENT DOCUMENTS

| | | | | |
|---|---|---|---|---|
| 2019/0375093 | A1* | 12/2019 | Kim | B25J 5/007 |
| 2020/0130197 | A1* | 4/2020 | Roh | B25J 13/003 |
| 2020/0156256 | A1* | 5/2020 | Park | B25J 5/007 |
| 2020/0341480 | A1* | 10/2020 | Jung | G05D 1/0246 |

FOREIGN PATENT DOCUMENTS

| | | |
|---|---|---|
| KR | 1020110072292 | 6/2011 |
| KR | 1020180038884 | 4/2018 |
| KR | 1020180040908 | 4/2018 |

OTHER PUBLICATIONS

Azendot et al., Enabling building service robots to guide blind people a participatory design approach, 2016, IEEE, p. 3-10 (Year: 2016).*

Veloso et al., CoBots: Collaborative robots servicing multi-floor buildings, 2012, IEEE, p. 5446-5447 (Year: 2012).*

Hada et al., Delivery service robot using distributed acquisition, actuators and intelligence, 2004, IEEE, p. 2997—(Year: 2004).*

Korean Intellectual Property Office Application No. 10-2018-0067876, Office Action dated Nov. 21, 2019, 9 pages.

Korean Intellectual Property Office Application No. 10-2018-0067876, Notice of Allowance dated Aug. 11, 2020, 3 pages.

* cited by examiner

MOVING ROBOT AND OPERATING METHOD FOR THE SAME

CROSS-REFERENCE TO RELATED APPLICATION

Pursuant to 35 U.S.C. § 119(a), this application claims the benefit of earlier filing date and right of priority to Korean Patent Application No. 10-2018-0067876, filed on Jun. 14, 2018, the contents of which are incorporated by reference herein in their entirety.

BACKGROUND OF THE INVENTION

1. Field of the Invention

The present invention relates to a robot and an operating method for the same, and more particularly, to a moving robot capable of providing a guidance service, and an operating method for the same.

2. Description of the Related Art

In public places such as airport, railway station, harbor, department store, and theater, information is provided to users through electronic display board, indicator board, and the like. However, the electronic display board, the indicator board, and the like transmit only some information selected by a service provider unilaterally, and cannot meet the demands of individual users.

Meanwhile, in recent years, the introduction of kiosks for providing information and services to users using multimedia devices such as display means, touch screens, speakers, and the like is increasing. However, even in this case, since the user has to manipulate the kiosk directly, a user may have difficulty in using a device and the device cannot actively respond to the request of the user.

Meanwhile, robots have been developed for industrial use and have been part of factory automation. In recent years, the application field of robots has been expanded, and thus, medical robots, aerospace robots, and the like have been developed, and household robots that can be used in ordinary homes have been manufactured.

Therefore, research on ways to provide various services such as guidance and advertisement in public places using robots is increasing.

Meanwhile, the moving robot is capable of moving by itself, is free to move, and has a plurality of means for avoiding obstacles during traveling, so that it can travel while avoiding obstacles and cliffs.

For example, Korean Patent Laid-Open Publication No. 10-2013-0141979 discloses a moving robot having a light source unit for irradiating light in a cross pattern and a camera unit for acquiring a forward image.

An infrared sensor or an ultrasonic sensor may be used for detecting an obstacle of the moving robot. The moving robot determines the presence and distance of the obstacle through the infrared sensor, and the ultrasonic sensor emits an ultrasonic wave having a certain cycle.

When there is an ultrasonic wave reflected by the obstacle, the ultrasonic sensor can determine the distance to the obstacle by using a time difference between a time when the ultrasonic wave is emitted and a moment when the ultrasonic wave is returned as being reflected by the obstacle.

A moving robot operated in public places such as airports, railway stations, department stores, and ports where many people stay or move can recognize people and obstacles, and can automatically travel and provide various services.

Conventional guidance robots unconditionally lead to the destination when guidance service is requested. However, in some situations, it may be better not to receive the robot guidance service in terms of efficiency and safety.

Accordingly, there is a need for a method of determining whether the moving robot is able to accomplish guidance, as well as a method of automatically traveling while recognizing a person or an obstacle to ensure safety.

SUMMARY OF THE INVENTION

The present invention has been made in view of the above problems, and provides a robot that can determine whether an escort service is provided, based on information related to a guidance destination in a public place, and an operating method for the same.

The present invention further provides a robot that can determine whether an escort service can be provided even in a service provision process such as a route guidance, and an operating method for the same.

The present invention further provides a robot that can effectively provide information related to a guidance destination to improve user convenience, and an operating method for the same.

In accordance with an aspect of the present invention, a method of operating a robot includes: providing position information about a destination; receiving a request for an escort service to the destination in response to the position information; determining whether the escort service is available based on information related to the destination, the information related to the destination including at least one of state information of the destination or time information related to the destination; causing the robot to move and provide guiding to the destination in response to the request when the escort service is available; and notifying that the escort service is not available when the escort service is not available.

In accordance with another aspect of the present invention, a robot includes: a voice input unit configured to receive a voice input of a user; a display configured to receive a touch input of a user; and a controller configured to: cause the display to display position information about a destination; determine whether an escort service is available based on information related to the destination when a request for the escort service is received through the voice input unit or the display, the information related to the destination comprising at least one of state information of the destination or time information related to the destination; cause the robot to move and provide guiding to the destination in response to the request when the escort service is available; and notify that the escort service is not available when the escort service is not available.

According to at least one of embodiments of the present invention, it is possible to determine autonomously whether an escort service is available based on information related to a guidance destination in a public place.

In addition, according to at least one of embodiments of the present invention, it is possible to determine whether an escort service is available even in a process of providing a service such as route guidance.

In addition, according to at least one of embodiments of the present invention, it is possible to provide a guide service in a public place, and to easily provide information displayed on a display in a process of providing a service such as route guidance.

Further, according to at least one of embodiments of the present invention, information related to guidance destination can be effectively provided, thereby improving user convenience.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE PREFERRED EMBODIMENTS

Figure 1:
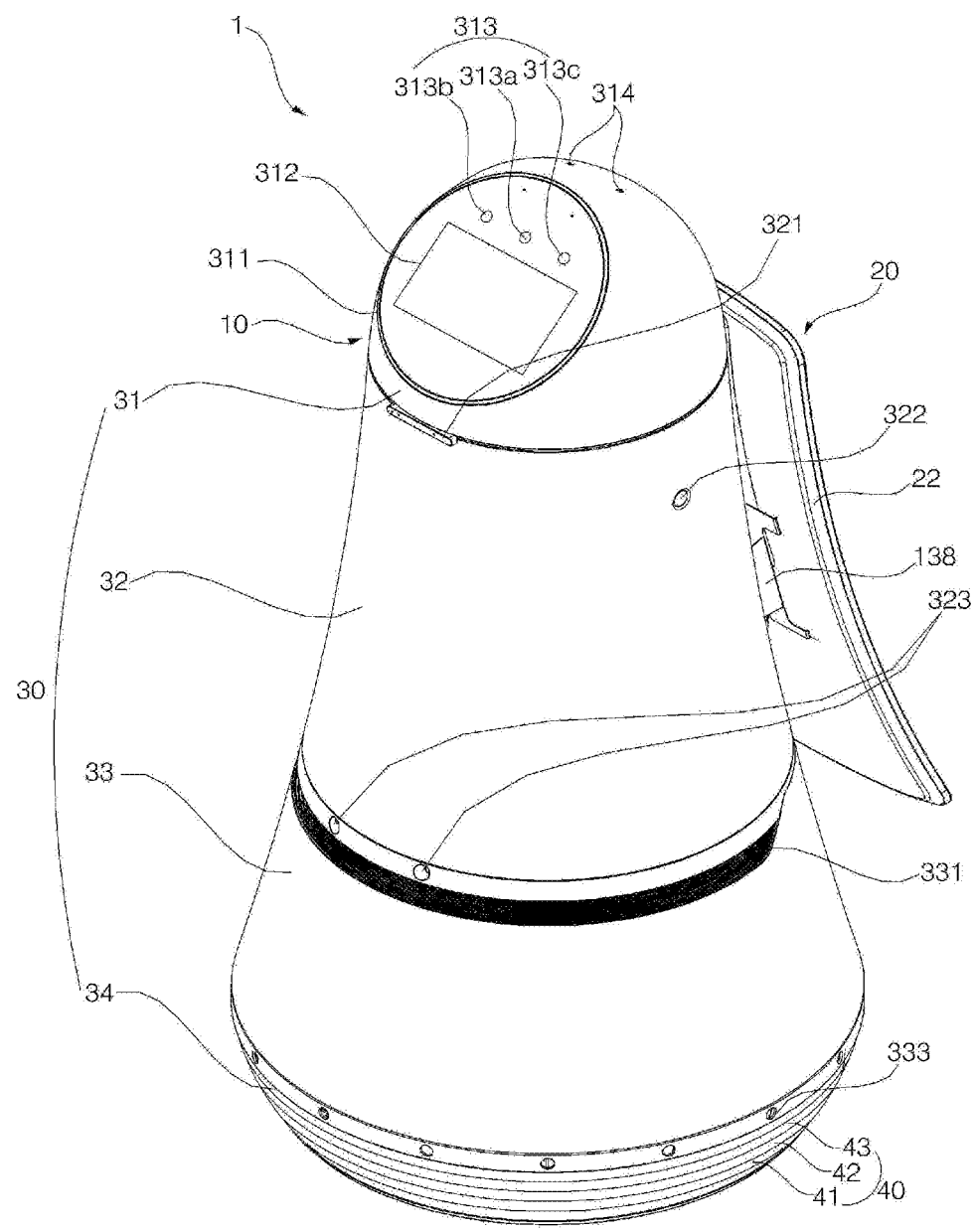
FIG. 1 is a perspective view of a moving robot according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. Although the terms "first," "second," etc., may be used herein to describe various components, these components should not be limited by these terms. These terms are only used to distinguish one component from another component.

Figure 2:
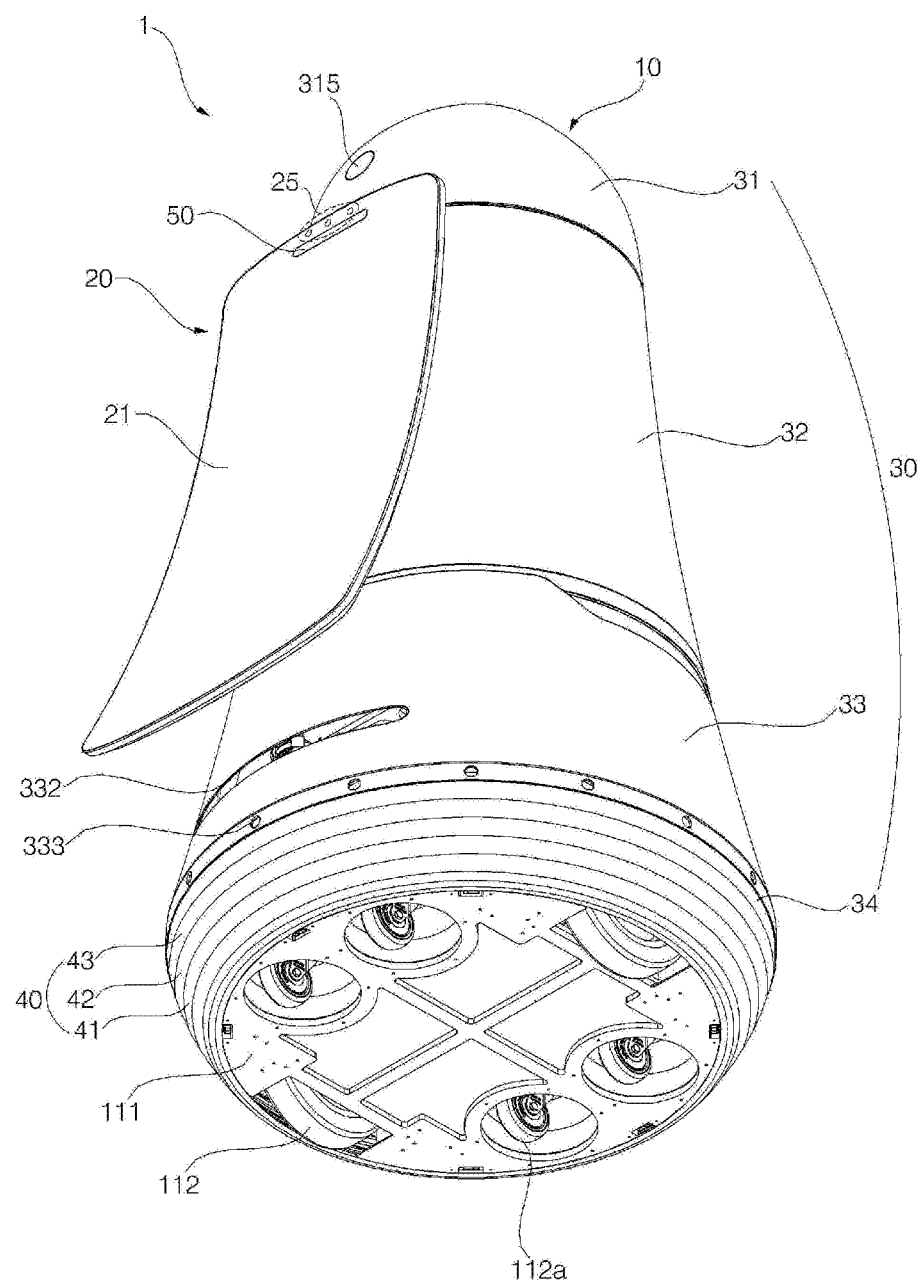
FIG. 2 is a bottom perspective view of a moving robot viewed from below according to an embodiment of the present invention.
Figure 3:
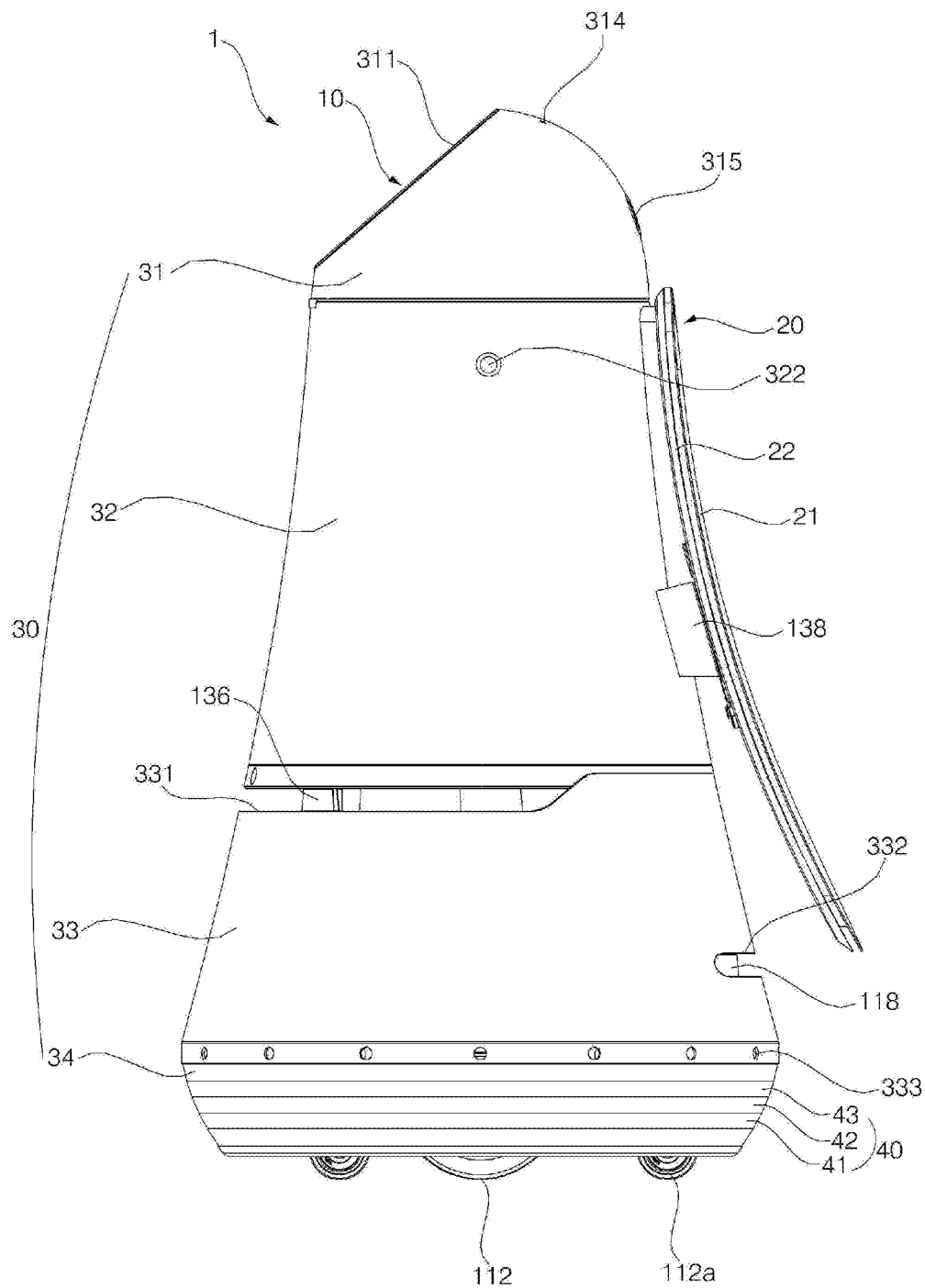
FIG. 3 is a side view of a moving robot according to an embodiment of the present invention.

FIG. 1 is a perspective view of a moving robot according to an embodiment of the present invention, FIG. 2 is a bottom perspective view of a moving robot viewed from below according to an embodiment of the present invention, and FIG. 3 is a side view of a moving robot according to an embodiment of the present invention.

Referring to FIGS. 1 to 3, a moving robot 1 according to an embodiment of the present invention may include a main body 10 that forms an outer appearance and houses various components therein.

The main body 10 may have a long length in a vertical direction, and may have a roly-poly shape that becomes slender as it goes up from the lower part to the upper part.

The main body 10 may include a case 30 forming an outer appearance of the moving robot 1. The case 30 may include a top cover 31 disposed in the upper side, a first middle cover 32 disposed below the top cover 31, a second middle cover 33 disposed below the first middle cover 32, and a bottom cover 34 disposed below the second middle cover 33. Here, the first middle cover 32 and the second middle cover 33 may be implemented by the same middle cover.

The top cover 31 is positioned in the uppermost end of the moving robot 1, and may have a hemispherical shape or a dome shape. The top cover 31 may be positioned at a lower height than a general adult's height so as to easily receive a command from a user. The top cover 31 may be configured to rotate at a certain angle.

Meanwhile, the top cover 31 is disposed in the uppermost end of the moving robot 1, and houses various components therein, and may have a shape and function similar to those of a human head and accomplish interaction with the user. Therefore, the top cover 31 and the components disposed therein may be referred to as a head. Further, the configuration of the components housed inside the top cover 31 or disposed outside the top cover 31 may be referred to as a head unit. Meanwhile, the remaining portion disposed below the head may be referred to as a body.

The top cover 31 may include an operation unit 311 in one side of a front surface. The operation unit 311 may serve to receive a command from a user. To this end, the operation unit 311 may include a display 312 for receiving a touch input from a user.

The display 312 disposed in the operation unit 311 may be referred to as a first display or a head display 312, and the display included in a display unit 20 disposed in the body may be referred to as a second display or a body display 21.

The head display 312 may form a mutual layer structure with a touch pad to implement a touch screen. In this case, the head display 312 may be used as an input device for inputting information by a user's touch as well as an output device.

In addition, the operation unit 311 may be directed upward by a certain angle so that a user can easily operate the operation unit 311 while viewing the head display 312 in a downward direction. For example, the operation unit 311 may be disposed on a surface which is formed by cutting a part of the top cover 31. Accordingly, the head display 312 may be disposed to be inclined.

In addition, the operation unit 311 may have a circular or elliptical shape as a whole. The operation unit 311 may be implemented in a manner similar to a human face shape.

For example, the operation unit 311 has a circular shape, and one or more structures for expressing eyes, nose, mouth, eyebrows, or the like of a human may be positioned on the operation unit 311.

That is, on the operation unit 311, a specific structure may be disposed or a specific paint may be painted to express the eyes, nose, mouth, eyebrows, or the like of a human. Therefore, the operation unit 311 has a human face shape, thereby providing a user with an emotional feeling. Furthermore, when a robot having a human face shape travels, it is possible to give a feeling that a person is moving, thereby relieving the repulsion toward a robot.

As another example, one or more images for expressing the eyes, nose, mouth, eyebrows, or the like of a human may be displayed on the head display 312.

That is, on the head display 312, not only information related to a route guidance service, but also various images for expressing the human face shape may be displayed. On the head display 312, an image for expressing a facial expression determined at a certain time interval or at a specific time may be displayed.

Meanwhile, referring to FIG. 1, the direction in which the body display 21 faces is defined as "rear ward", and the opposite direction of "rear ward" is defined as "forward".

In addition, the operation unit 311 may be provided with a head camera unit 313 for recognizing people and objects.

The head camera unit 313 may be disposed in the upper side of the head display 312. The head camera unit 313 may include a 2D camera 313a and a RGBD (Red, Green, Blue, Distance) sensor 313b, 313c.

The 2D camera 313a may be a sensor for recognizing a person or an object based on a two-dimensional image.

In addition, the RGBD sensor 313b, 313c may be a sensor for acquiring a person's position or a face image. The RGBD sensor 313b, 313c may be a sensor for detecting a person or an object by using captured images having depth data acquired from a camera having RGBD sensors or from other similar 3D imaging devices.

In order to accurately detect a person's position or a face image, a plurality of RGBD sensors 313b and 313c may be provided. For example, two RGBD sensors 313b, 313c may be disposed in the left and right sides of the 2D camera 313a.

The head camera unit 313 may be configured of a 3D vision sensor such as an RGBD camera sensor. The head camera unit 313 may sense a person present within a certain distance, presence of a guidance object in a guidance mode, a distance between a person and the moving robot 1, a moving speed of a person, or the like.

Meanwhile, although not shown in the drawings, the operation unit 311 may further include a physical button for directly receiving a command from a user.

In addition, the top cover 31 may further include a microphone 314. The microphone 314 may serve to receive a command of an audio signal from a user. For example, the microphone 314 may be formed at four points on the upper end portion of the top cover 31 to accurately receive the voice command from the user. Therefore, even when the moving robot 1 is traveling or the top cover 31 is rotating, the route guidance request from the user can be accurately received.

In an embodiment of the present invention, the top cover 31 may be rotated so that the operation unit 311 is oriented toward the moving direction while the moving robot 1 is moving. When the moving robot 1 receives a command (e.g., voice command) from the user while the moving robot 1 is moving, the top cover 31 may be rotated so that the operation unit 311 is oriented toward the direction in which the user is positioned.

Alternatively, when the moving robot 1 receives a command from the user while the moving robot 1 is moving, the top cover 31 may be rotated in a direction opposite to the moving direction of the moving robot 1. That is, the top cover 31 may be rotated in a direction that the body display unit 20 faces. Accordingly, the user may operate the operation unit 311 effectively while viewing guidance service information or the like displayed on the body display unit 20.

Figure 4:
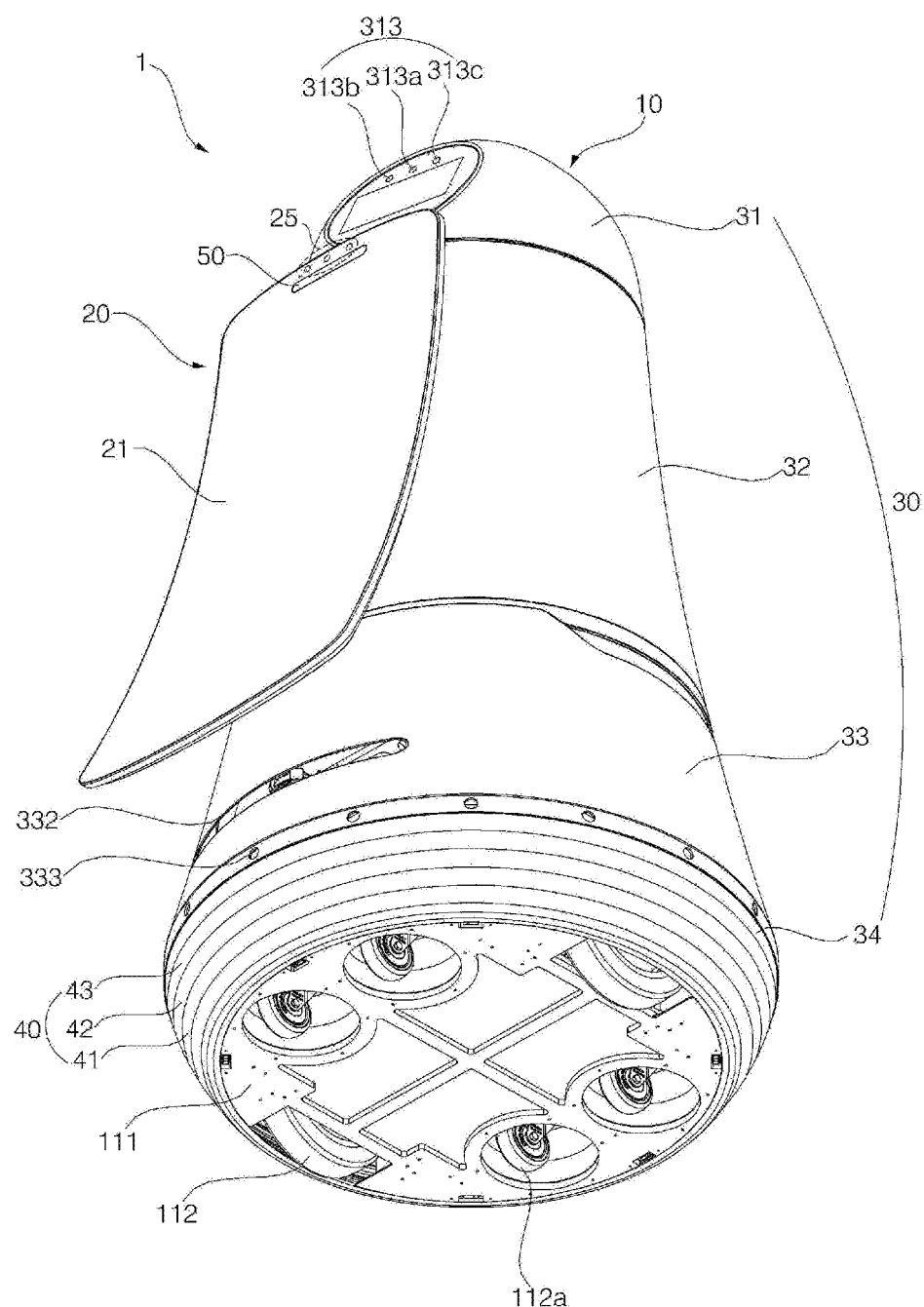
FIG. 4 is a view illustrating arrangement of displays of a moving robot according to an embodiment of the present invention.

FIG. 4 is a view illustrating arrangement of the displays of the moving robot 1 according to an embodiment of the present invention.

Referring to FIG. 4, when the moving robot 1 receives a command from the user in an interaction state or is in a standby state, the displays 312 and 20 may be arranged in one direction, so that a user or users of public places can more easily view the information displayed on the two displays 312, 20.

The interaction state may correspond to a case where the moving robot 1 provides a voice guidance, a menu screen, or the like to a certain user, receives a touch, voice input from the user, or is providing a guidance service.

Meanwhile, the viewing directions of the operation unit 311 and the body display unit 20 may be opposite to each other. In this case, for example, the operation unit 311 may be oriented toward one direction, and the display unit 20 may be oriented toward the other direction opposite to the one direction. Therefore, there is an advantage in that the information displayed on the operation unit 311 or the body display unit 20 can be viewed from both directions.

Preferably, in a state where the mobile robot 1 is moving or stopped, the directions viewed by the operation unit 311 and the body display unit 20 may be different from each other when the moving robot 1 is moving or stopped.

For example, when the moving robot 1 is traveling, as illustrated in FIG. 1, the directions viewed by the operation unit 311 and the body display unit 20 may be opposite to each other.

In addition, when the moving robot 1 is in a standby state, as illustrated in FIG. 4, the directions viewed by the operation unit 311 and the body display unit 20 may be the same.

In addition, the top cover 31 may further include an emergency operation button 315. The emergency operation button 315 may serve to immediately stop the operation of the moving robot 1 when touched while the moving robot 1 is stopped or moving. For example, the emergency operation button 315 may be positioned in the rear side of the moving robot 1 so that the emergency operation button 315 can be operated easily, even if the moving robot 1 is moving forward.

The first middle cover 32 may be disposed below the top cover 31. Various electronic components including a substrate may be positioned inside the first middle cover 32. The first middle cover 32 may have a cylindrical shape having a larger diameter as it goes downward from the upper portion.

More preferably, the first middle cover 32 may include an RGBD sensor 321. The RGBD sensor 321 may detect a collision between the moving robot 1 and an obstacle while the moving robot 1 is moving. For this purpose, the RGBD sensor 321 may be positioned in a direction in which the moving robot 1 moves, that is, in the front side of the first middle cover 32.

For example, the RGBD sensor 321 may be positioned in the upper end of the first middle cover 32, taking into account the obstacle or human height present in front of the moving robot 1.

However, the present invention is not limited thereto, and the RGBD sensor 321 may be disposed in various positions in the front side of the first middle cover 32.

According to an embodiment, the RGBD sensor 321 may be constituted by a 3D vision sensor, and may sense a person present within a certain distance, presence of a guidance object in a guidance mode, a distance between a person and the moving robot 1, a moving speed of a person, or the like.

In some embodiments, the RGBD sensor 321 may not be disposed in the first middle cover 32 and the function of the RGBD sensor 321 may be performed in the head camera unit 313.

In addition, the first middle cover 32 may further include a speaker hole 322. The speaker hole 322 transmits sound generated from the speaker to the outside. The speaker hole 322 may be formed on the outer peripheral surface of the first middle cover 32, and a single speaker hole may be formed. Alternatively, a plurality of speaker holes 322 may be formed on the outer peripheral surface of the first middle cover 32 to be spaced apart from each other.

In addition, the first middle cover 32 may further include a stereo camera hole 323. The stereo camera hole 323 may be a hole for operation of a stereo camera (not shown) installed inside the main body 10. For example, the stereo camera hole 323 may be formed in a lower front end of the first middle cover 32. Accordingly, the stereo camera may photograph the front area of the moving robot 1 through the stereo camera hole 323.

The second middle cover 33 may be disposed below the first middle cover 32. A battery, a lidar for autonomous driving, and the like may be positioned inside the second middle cover 33. Like the first middle cover 32, the second middle cover 33 may have a cylindrical shape that has a larger diameter as they progress from the upper portion to the lower portion. The outer side of the second middle cover 33 may be connected to the outer side of the first middle cover 32 without a step. That is, the outer side of the second middle cover 33 and the outer side of the first middle cover 32 can be smoothly connected such that the outer appearance looks aesthetic.

Further, since the first middle cover 32 and the second middle cover 33 have a cylindrical shape that has a larger diameter as they progress from the upper portion to the lower portion, the overall shape may be a roly-poly shape. Therefore, the impact generated when the main body 10 collides with a person or an obstacle can be alleviated.

In detail, the second middle cover 33 may include a first incision portion 331. The first incision portion 331 may be formed laterally in the front side of the outer peripheral surface of the second middle cover 33. The first incision portion 331 is a portion cut from the second middle cover 33 so that a front lidar 136, which will be described later, can be operated.

Specifically, the first incision portion 331 may be cut by a certain length in the radial direction from the outer peripheral surface of the front side of the second middle cover 33. Here, the front lidar 136 is positioned inside the second middle cover 33. The first incision portion 331 may be formed by being cut along the circumference of the second middle cover 33 on the outer peripheral surface of the second middle cover 33 corresponding to the position of the front lidar 136. That is, the first incision portion 331 and the front lidar 136 may face each other. Therefore, the front lidar 136 may be exposed to the outside by the first incision portion 331.

For example, the first incision portion 331 may be cut by 270 degrees around the front side of the second middle cover 33. The reason that the first incision portion 331 should be formed in the second middle cover 33 is to prevent the laser emitted from the front lidar 136 from being directly irradiated to the eyes of an adult or a child.

In addition, the second middle cover 33 may further include a second incision portion 332. The second incision portion 332 may be formed laterally in the rear side of the outer peripheral surface of the second middle cover 33. The second incision portion 332 is a portion cut from the second middle cover 33 so that a rear lidar 118, which will be described later, can be operated.

Specifically, the second incision portion 332 may be cut by a certain length in the radial direction from the outer peripheral surface of the rear side of the second middle cover 33. Here, the rear lidar 118 is positioned inside the second middle cover 33. The second incision portion 332 may be formed by being cut along the circumference of the second middle cover 33 at a position corresponding to the position of the rear lidar 118. Therefore, the rear lidar 118 may be exposed to the outside by the second incision portion 332. For example, the second incision 332 may be cut by 130 degrees along the circumference in the rear side of the second middle cover 33.

In the present embodiment, the first incision portion 331 may be spaced apart from the second incision portion 332 in the vertical direction so that the first incision portion 331 and the second incision portion 332 are not connected. The first incision portion 331 may be positioned above the second incision portion 332.

If the first incision portion 331 and the second incision portion 332 are positioned in the same line, the laser emitted from the lidar of one moving robot may be irradiated to the lidar of the other moving robot. Then, the lasers emitted from the lidars of the respective moving robots may interfere with each other, and thus, accurate distance detection may become difficult. In this case, it is impossible to detect the distance between the moving robot and the obstacle, such that normal traveling is difficult, possibly causing the moving robot and the obstacle to collide with each other.

Further, the second middle cover 33 may further include an ultrasonic sensor 333. The ultrasonic sensor 333 may be a sensor for measuring the distance between the obstacle and the moving robot 1 by using an ultrasonic signal. The ultrasonic sensor 333 may serve to detect an obstacle close to the moving robot 1.

For example, a plurality of ultrasonic sensors 333 may be provided to detect obstacles in all directions close to the moving robot 1. The plurality of ultrasonic sensors 333 may be disposed to be spaced apart from each other around the lower end of the second middle cover 33.

The bottom cover 34 may be disposed below the second middle cover 33. A wheel 112, a caster 112a, and the like may be positioned inside the bottom cover 34. Unlike the first middle cover 32 and the second middle cover 33, the bottom cover 34 may have a cylindrical shape whose diameter decreases as it progresses from the upper portion to the lower portion. That is, the main body 10 has a roly-poly shape as a whole to reduce the amount of impact applied when the robot is in a collision state, and the lower end of the main body 10 has a structure of becoming narrow inwardly to prevent a human foot from being caught by the wheels of the robot.

In detail, a base 111 may be positioned inside the bottom cover 34. The base 111 may form a bottom surface of the moving robot 1.

The base 111 may be provided with a wheel 112 for traveling of the moving robot 1. A pair of wheels 112 may be positioned in the left and right sides of the base 111, respectively.

In addition, the base 111 may be provided with a caster 112a for assisting the moving of the moving robot 1. Here, the caster 112a may be constituted of a plurality of casters for manual movement of the moving robot 1. For example, two casters 112a may be positioned in the front portion of the base 111, and two casters 112*a* may be positioned in the rear portion of the base 111, respectively.

According to the above-described caster structure, when the power of the moving robot 1 is turned off or the moving robot 1 is to be moved manually, there is an advantage that the moving robot 1 can be pushed and moved without applying a large force.

The bottom cover 34 may be provided with light emitting modules 40 that include one or more light emitting diodes (LEDs) respectively, and at least one of the light emitting modules 40 may be turned on or off according to the operation state of the moving robot. For example, at least one of the light emitting modules 40 may output light of a certain color or may blink at certain cycles according to the operation state of the moving robot 1. In addition, two or more light emitting modules among the light emitting modules 40 may output light in a certain pattern according to the operation state of the moving robot.

The light emitting modules 40 may include one or more light emitting diodes as a light source respectively. When a plurality of light sources are provided, the plurality of light sources may be disposed with a constant pitch for uniform light supply. The number of light sources and the pitch may be set in consideration of the light intensity. Further, all the colors of the plurality of light sources may be white, or the colors of adjacent light sources may be mixed to emit white light.

The light source may be an aggregate in which a plurality of light emitting diodes are disposed close to each other, as well as a single light emitting diode. In addition, it is also possible to include, for example, a case in which red, blue, and green light emitting diodes, which are three primary colors of light, are disposed close to each other.

Preferably, the light emitting modules 40 may be disposed along the periphery of the bottom cover 34. For example, the light emitting modules 40 may be disposed on any circle that surrounds the periphery of the bottom cover 34 in the horizontal direction.

The light emitting modules 40 may be disposed in the bottom cover 34, which is the lower end of the moving robot 1, so that the light emitting modules 40 may be disposed in a position considerably lower than a human eye level. Accordingly, when the light emitting modules 40 continuously output or blink a specific light, people can feel less glare.

The light emitting modules 40 are disposed to surround the bottom cover 34 in the horizontal direction so that people can see light emitted from the light emitting modules 40 in any direction of 360 degrees.

The light emitting modules 40 are disposed in the bottom cover 34 to be spaced apart from the body display 21 of a large screen which displays a certain image. Accordingly, it is possible to prevent the output light of the light emitting modules 40 and the output image of the body display 21 from deteriorating visibility of each other.

In addition, the light emitting modules 40 may have a plurality of rows and may be disposed in multiple stages. Accordingly, visibility of light outputted by the light emitting modules 40 can be further increased.

For example, the light emitting modules 40 may be disposed in three rows 41, 42, and 43 having different lengths. In this case, the length of the row 41 positioned in the lowermost end of the three rows 41, 42, and 43 may be the shortest.

More preferably, the light emitting modules 40 may be disposed to have a plurality of rows and columns. For example, the light emitting modules 40 may be disposed in three rows 41, 42 and 43, and each row 41, and 43 may include a plurality of light emitting modules which are independently controllable. Accordingly, the light emitting modules 40 may have a plurality of rows and columns, and when the entire light emitting modules 40 are unfolded, they may be disposed in the form of a matrix of M*N.

The body display unit 20 may be formed long in the vertical direction in one side of the moving robot 1. In detail, the body display unit 20 may include the body display 21 and a support portion 22.

The body display 21 may be positioned in the rear side of the first middle cover 32. The body display 21 may serve to output time information (e.g., airport gate inquiry information, route guidance service information, etc.) related to a service currently being provided.

The body display 21 may be a curved surface display having a shape curved outward with a certain curvature. That is, the body display 21 may have a concave shape as a whole. The body display 21 may have a shape that is more tilted backward as it goes down from the upper portion to the lower portion. In other words, the body display 21 may be formed to gradually go further away from the case 30 as it goes down from the upper portion to the lower portion.

According to the display unit structure described above, there is an advantage in that not only the information displayed on the body display 21 is visible in a position far from the moving robot 1, but also the information displayed on the body display 21 is not distorted at various angles.

In addition, according to an embodiment of the present invention, the moving robot 1 may move ahead along a set route to guide the user to the route. The user can see the body display unit 20 installed in the rear side of the moving robot 1 while following the moving robot 1. That is, even if the moving robot 1 moves to guide the route, the user can easily see the information displayed on the body display unit 20 while following the moving robot 1.

In addition, the upper end of the body display 21 may extend to the upper end of the first middle cover 32 and the lower end of the body display 21 may extend to the second incision portion 332. In this embodiment, the lower end of the body display 21 should be formed not to exceed the second incision portion 332. If the body display 21 is formed to cover the second incision portion 332, the laser emitted from the rear lidar 118 is struck against the lower end of the body display 21. Accordingly, the moving robot 1 may not be able to detect the distance to the obstacle positioned behind.

Meanwhile, the support portion 22 may serve to hold the body display 21 to be positioned in the rear side of the first middle cover 32. The support portion 22 may extend from the rear surface of the body display 21. The support portion 22 may be formed to be long in the vertical direction in the rear surface of the body display 21, and may protrude further while progressing downward from the upper portion to the lower portion.

In addition, the support portion 22 may be inserted into the first middle cover 32 through the rear side of the first middle cover 32. For this, a through hole (not shown) through which the support portion 22 can pass through may be formed in the rear of the first middle cover 32. The through-hole may be formed by cutting a part of the rear side of the outer peripheral surface of the first middle cover 32 rearward.

The body display unit 20 may be fixed to the inside of the main body 10 by a separate fixing member 138.

The fixing member 138 for fixing the body display unit 20 to the main body 10 may be provided inside the main body 10. One side of the fixing member 138 may be fixed to the main body 10 and the other side of the fixing member 138 may be fixed to the body display unit 20. To this end, the other side of the fixing member 138 may protrude to the outside of the case 30 through the through hole. That is, the support portion 22 and the fixing member 138 may be positioned together in the through-hole.

In the present embodiment, the body display unit 20 may be fastened to the fixing member 138 by fastening means. At this time, the support portion 22 of the body display unit 20 may be placed on the upper portion of the fixing member 138. In other words, the support portion 22 may be placed on the upper portion of the fixing member 138, and a part of the fixing member 138 may be fixed to a part of the body display unit 20. With such a display unit fixing structure, the body display unit 20 can be stably positioned in the rear side of the first middle cover 32.

In addition, the body display unit 20 may further include a ticket input port 50. The present embodiment illustrates that the ticket input port 50 is disposed in the body display unit 20, but the present invention is not limited thereto, and the ticket input port 50 may be disposed in other portion of the moving robot 1.

Meanwhile, the moving robot 1 may include a scanner (not shown in drawings) for scanning a ticket inserted into the ticket input port 50, and the scanner may be activated under the control of a controller 740.

According to an embodiment of the present invention, when a ticket such as an airline ticket, a baggage ticket, and the like is inserted into the ticket input port 50, the scanner provided inside the moving robot 1 may scan a bar code, a QR code, and the like included in the ticket.

In addition, the moving robot 1 may display a scan result on the body display 21, and provide a user with gate information, counter information, etc. according to the scan result.

Meanwhile, the body display unit 20 may further include a body camera unit 25 for identifying and tracking the guidance object. The body camera unit 25 may be constituted of a 3D vision sensor such as an RGBD camera sensor. The body camera unit 25 may sense a person present within a certain distance, presence of a guidance object in a guidance mode, a distance between a person and the moving robot 1, a moving speed of a person, and the like.

In some embodiments, the moving robot 1 may not include the body camera unit 25, but may further include a sensor for identifying and tracking a guidance object disposed in other area.

Figure 5:
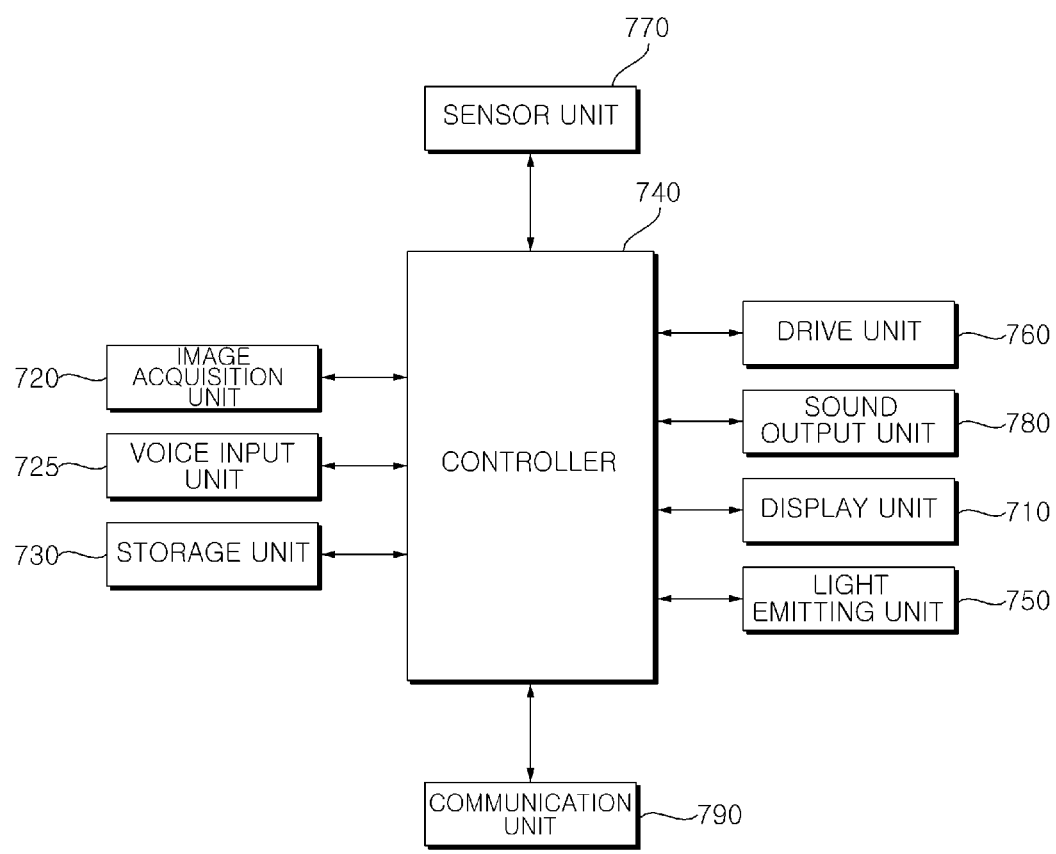
FIG. 5 is a block diagram illustrating a control relationship between main components of a moving robot according to an embodiment of the present invention.

FIG. 5 is a block diagram illustrating a control relationship between main components of a moving robot according to an embodiment of the present invention.

Referring to FIG. 5, the moving robot 1 according to an embodiment of the present invention may include a voice input unit 725 for receiving a user's voice input through the microphone 314, a storage unit 730 for storing various data, a communication unit 790 for transmitting/receiving data to/from other electronic device such as a server (not shown in drawings), a light emitting unit 750 including at least one light emitting module for outputting light to the outside, and a controller 740 for controlling the overall operation of the moving robot 1.

The voice input unit 725 may include a processing unit for converting an analog sound into digital data or may be connected to the processing unit, thereby converting a user input voice signal into data to be recognized by the controller 740 or a server (not shown in drawings).

The controller 740 may control the voice input unit 725, the storage unit 730, the light emitting unit 750, the communication unit 790, and the like constituting the moving robot 1 to control the overall operation of the moving robot 1.

The storage unit 730 records various types of information necessary for controlling the moving robot 1, and may include a volatile or nonvolatile recording medium. The recording medium stores data that can be read by a microprocessor, and includes a hard disk drive (HDD), a solid state disk (SSD), a silicon disk drive (SDD), a ROM, a RAM, a CD-ROM, a magnetic tape, a floppy disk, an optical data storage device, and the like.

In addition, the storage unit 730 may store various data necessary for the moving robot 1 to provide a guidance service.

In addition, the controller 740 may transmit the operation state of the moving robot 1, the user input, or the like to the server through the communication unit 790.

The communication unit 790 includes at least one communication module so that the moving robot 1 is connected to the Internet or a certain network.

Meanwhile, data for voice recognition may be stored in the storage unit 730, and the controller 740 may process a voice input signal of a user received through the voice input unit 725 and perform a voice recognition process.

Meanwhile, the controller 740 may control the moving robot 1 to perform a certain operation based on the voice recognition result.

For example, when the command included in the voice signal is a command for requesting certain information such as flight departure information, sightseeing guidance information, and the like, the controller 740 may cause displaying certain information such as flight departure information and sightseeing guidance information on the display unit 710.

In addition, if there is a user's guidance request, the controller 740 may control the moving robot 1 to escort a user to a guidance destination selected by the user.

More preferably, when there is a user's guidance request, the controller 740 may determine whether the escort service is available, based on information related to the destination.

If it is determined that the escort service is available, the controller 740 may control the moving robot 1 to enter an escort mode and move and guide to the destination.

If it is determined that the escort service is not available, the controller 740 may control the moving robot 1 to inform that the escort service is not available.

An embodiment in which the moving robot 1 determines autonomously whether an escort service is available will be described later in detail with reference to FIG. 6 to FIG. 12.

Meanwhile, the voice recognition process may be performed in the server, not in the moving robot 1 itself. In this case, the controller 740 may control the communication unit 790 to transmit the user input voice signal to the server, and may receive the recognition result of the voice signal from the server through the communication unit 790.

Alternatively, the moving robot 1 may perform simple voice recognition such as caller recognition, and high-level voice recognition such as natural language processing may be performed in the server.

Meanwhile, the moving robot 1 may include a display unit 710 for displaying certain information as an image and a sound output unit 780 for outputting certain information as a sound.

The display unit 710 may display information corresponding to a request input by a user, a processing result corresponding to a request input by the user, an operation mode, an operation state, an error state, and the like as an image.

As described above with reference to FIGS. 1 to 4, the display unit 710 may include a head display 312 and a body display 21. Since the body display 21 is relatively larger in size than the head display 312, it may be preferable to display information on the body display 21 in a large screen.

In addition, the sound output unit 780 may output a notification message such as an alarm sound, an operation mode, an operation state, and an error state, information corresponding to a request input by the user, a processing result corresponding to a request input by the user, and the like. The sound output unit 780 may convert an electrical signal from the controller 740 into an audio signal and output the audio signal. For this purpose, a speaker or the like may be provided.

Meanwhile, the moving robot 1 may include an image acquisition unit 720 for photographing a certain range.

The image acquisition unit 720 photographs the surroundings of the moving robot 1, the external environment, and the like, and may include a camera module. Several cameras may be installed for each part of the moving robot for photographing efficiency.

For example, as described above with reference to FIGS. 1 to 4, the image acquisition unit 720 may include a head camera unit 313 for recognizing a person and an object, and a body camera unit 25 for identifying and tracking the guidance object. However, the number, arrangement, type, and photographing range of the cameras included in the image acquisition unit 720 are not necessarily limited thereto.

The image acquisition unit 720 may photograph an image for user recognition. The controller 740 may determine an external situation or recognize a user (guidance object), based on the image photographed and acquired by the image acquisition unit 720.

In addition, the controller 740 may control the moving robot 1 to travel, based on the image photographed and acquired by the image acquisition unit 720.

Meanwhile, the image photographed and acquired by the image acquisition unit 720 may be stored in the storage unit 730.

Meanwhile, the moving robot 1 may include a drive unit 760 for moving, and the drive unit 760 may move the main body 10 under the control of the controller 740.

The drive unit 760 may include at least one drive wheel 112 for moving the main body 10 of the moving robot 1.

The drive unit 760 may include a drive motor (not shown in drawings) connected to the drive wheel 112 to rotate the drive wheel.

The drive wheels 112 may be provided in the left and right sides of the main body 10, respectively, and may be referred to as left and right wheels, respectively.

The left wheel and the right wheel may be driven by a single drive motor, but may be provided with a left wheel drive motor for driving the left wheel and a right wheel drive motor for driving the right wheel, respectively, if necessary. The traveling direction of the main body 10 may be switched to the left or right side by making a difference in the rotational speeds of the left and right wheels.

Meanwhile, the moving robot 1 may include a sensor unit 770 including sensors for sensing various data related to the operation and state of the moving robot 1.

The sensor unit 770 may include an obstacle detection sensor that detects an obstacle. The obstacle detection sensor may include an infrared sensor, an ultrasonic sensor, an RF sensor, a geomagnetic sensor, a position sensitive device (PSD) sensor, and the like. For example, the obstacle detection sensor may correspond to the ultrasonic sensor 333, the RGBD sensor 321, and the like described above with reference to FIGS. 1 to 4.

In addition, the sensor unit 770 may further include a cliff sensor 113 for detecting the existence of a cliff on the floor in a traveling area.

In some embodiments, the sensor unit 770 may further include a sensor for detecting a magnitude of a sound acquired through the microphone 314, and accordingly, may sense the magnitude of a voice uttered by the user, and the magnitude of ambient noise.

Alternatively, without further including a separate sensor, the voice input unit 725 may determine the magnitude of the voice of a user and the ambient noise during the processing of a signal acquired through the microphone 314.

In addition, the sensor unit 770 may include a light detection and ranging (Lidar) 136, 118.

The lidar 136, 118 may detect an object such as an obstacle, based on a Time of Flight (TOF) of a transmission signal and a reception signal or a phase difference between a transmission signal and a reception signal, by a medium of a laser light.

Further, the lidar 132*a*, 132*b* may detect a distance to the object, a relative speed with the object, and a position of the object.

The lidar 132*a*, 132*b* may be provided as part of the configuration of the obstacle detection sensor. Further, the lidar 132*a*, 132*b* may be provided as a sensor for creating a map.

Meanwhile, the obstacle detection sensor detects an object, particularly an obstacle, existing in a movement direction of the moving robot 1, and transmits obstacle information to the controller 740. At this time, the controller 740 may control the motion of the moving robot 1 according to the position of the detected obstacle.

The sensor unit 770 may further include a motion sensor for detecting motion of the moving robot 1 according to driving of the main body 101 and outputting motion information. For example, a gyro sensor, a wheel sensor, an acceleration sensor, and the like may be used as the motion sensor.

The gyro sensor senses the rotation direction and detects the rotation angle when the moving robot 1 moves according to the operation mode. The gyro sensor detects the angular velocity of the moving robot 1 and outputs a voltage value proportional to the angular velocity. The controller 740 calculates the rotation direction and the rotation angle by using the voltage value outputted from the gyro sensor.

The wheel sensor is connected to the left and right wheels to detect the number of rotations of the wheel. Here, the wheel sensor may be a rotary encoder. The rotary encoder detects and outputs the number of rotations of the left and right wheels.

The controller 740 may calculate the rotational speeds of the left and right wheels by using the number of rotations. In addition, the controller 740 may calculate the rotation angle by using a difference in the number of rotations of the left and right wheels.

The acceleration sensor detects a speed change of the moving robot 1, for example, a change in the moving robot 1 due to a start, a stop, a direction change, a collision with an object, or the like. The acceleration sensor is attached to the adjacent position of the main wheel or the auxiliary wheel, so that the slip or idling of the wheel can be detected.

In addition, the acceleration sensor is built in the controller 740 and may detect a speed change of the moving robot 1. That is, the acceleration sensor detects impulse due to the speed change and outputs a corresponding voltage value. Thus, the acceleration sensor may perform the function of an electronic bumper.

The controller 740 may calculate the position change of the moving robot 1 based on operation information outputted from the motion sensor. Such a position is a relative position corresponding to the absolute position using image information. The moving robot 1 may improve the performance of the position recognition using the image information and the obstacle information through the relative position recognition.

The light emitting unit 750 may include a plurality of light emitting modules. For example, as described with reference to FIGS. 1 to 4, the light emitting unit 750 may include light emitting modules 40 including one or more light emitting diodes (LEDs) respectively.

In addition, the light emitting modules 40 may be disposed in the bottom cover 34, and the light emitting modules 40 may be operated under the control of the controller 740.

For example, the controller 740 may control at least one of the light emitting modules 40 to output light of a certain color or to blink at certain cycles according to the operation state of the moving robot. In addition, the controller 740 may control two or more modules of the light emitting modules 40 to output light in a certain pattern according to the operation state of the moving robot.

As described above with reference to FIGS. 1 to 5, the mobile robot 1 according to an embodiment of the present invention may include a top cover 31 provided to be rotatable, a first display 312 disposed in the top cover 31, a second display 21 having a size larger than the first display 312, a middle cover 32, 33 coupled with the second display 21 and the top cover 31, a bottom cover 34 positioned below the middle cover 32, 33, a light emitting unit 750 including light emitting modules 40 disposed along the periphery of the bottom cover 34, and a controller 740 for controlling the light emitting modules 40 based on the current state of the mobile robot 1.

Each of the light emitting modules 40 of the light emitting unit 750 may include at least one light source. For example, the light emitting modules 40 may include one or more light emitting diodes (LEDs), respectively.

Conventional analog lighting has a limitation in precisely controlling the illumination, but the light emitting diode (LED) can precisely control the illumination by adjusting the amount of applied current and the width of a driving pulse. In addition, when the light emitting diodes (LEDs) of R, G, and B colors are provided in combination, the light of a specific color can be provided and the adjustment of the color temperature can be easily accomplished.

The light emitting diode (LED) may be a single color light emitting diode (LED) such as Red, Blue, Green, and White. In some embodiments, the light emitting diode (LED) may be a multicolor light emitting diode (LED) for reproducing a plurality of colors.

In addition, the light emitting modules 40 may include a plurality of light emitting diodes (LEDs). All the plurality of light emitting diodes (LEDs) may emit white light to provide white lighting. Red, blue, and green light emitting diodes (LEDs) may be combined to provide illumination of a specific color or a white light.

For example, the light emitting modules 40 may output a first color (White) indicating a normal operation state, a second color (Yellow) indicating a pause state, and a third color (Red) indicating an error state.

The light emitting modules 40 may display the current operation state of the output light through colors and patterns, and may serve as a signal light for informing people of the traveling state and the operation state of the moving robot 1.

In addition, the controller 740 may control the light emitting unit 750.

For example, the controller 740 may control at least one of the light emitting modules 40 to output light of a certain color according to the current state of the moving robot 1. In addition, the controller 740 may control at least one of the light emitting modules 40 to blink in a certain cycle for a certain time.

When the mobile robot 1 moves or travels, even when a user approaches the mobile robot 1 for information check, setting input, and other manipulation, or when a child touches the mobile robot 1 with curiosity, if the mobile robot 1 continues to travel, a safety accident such as a collision may occur.

Particularly, public places such as airport, railway station, terminal, department store, and mart have a large number of floating population, and there are many unexpected variables that lead to a higher risk of safety accidents.

Accordingly, when operating in a public place, the moving robot 1 according to the present invention outputs light indicating the current operation state of the moving robot 1 through the light emitting unit 750, thereby providing signal information that allows people existing in a public place to easily recognize the current state of the mobile robot 1. Accordingly, the possibility of an accident between a person and the moving robot 1 in a public place can be reduced.

Since the light emitting modules 40 are disposed apart from the second display 21 on the bottom cover 34 that is the lower end of the moving robot 1, they can be disposed in a position relatively lower than the eye level of the human and the second display 21. Accordingly, when the light emitting modules 40 continuously output or blink a specific light, people can feel less glare, and the output light of the light emitting modules 40 and the output image of the body display 21 can be prevented from deteriorating visibility of each other.

Preferably, the light emitting modules 40 may be disposed along the periphery of the bottom cover 34. The light emitting modules 40 are disposed to surround the bottom cover 34 in the horizontal direction so that people can see light emitted from the light emitting modules 40 in any direction of 360 degrees.

Meanwhile, the light emitting modules 40 may have a plurality of rows and may be disposed in multiple stages. Accordingly, visibility of light outputted by the light emitting modules 40 can be enhanced.

Figure 6:
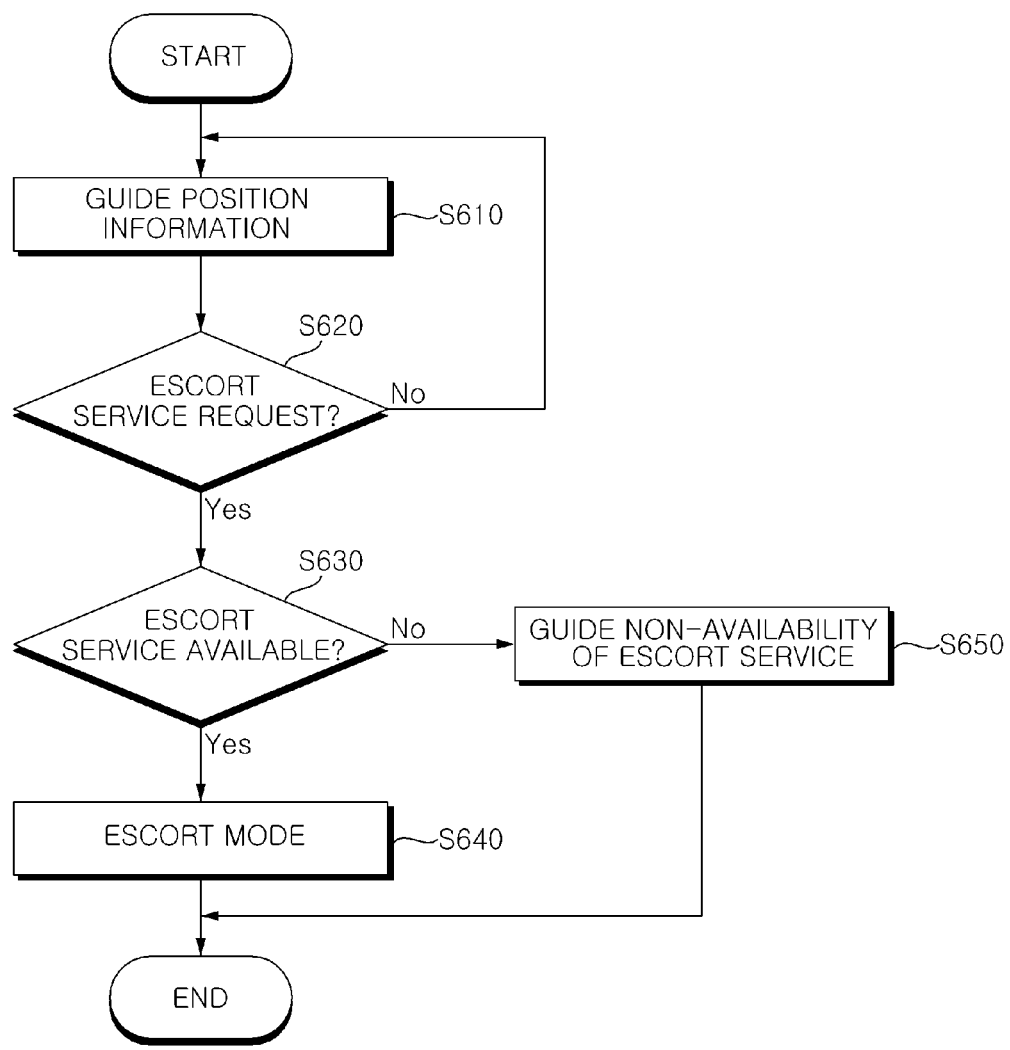
FIG. 6 is a flowchart illustrating an operating method of a moving robot according to an embodiment of the present invention.

FIG. 6 is a flowchart illustrating an operating method of a moving robot according to an embodiment of the present invention, and FIGS. 7 to 9B are views for explaining an operating method of a moving robot according to an embodiment of the present invention.

Referring to FIG. 6, the moving robot 1 according to an embodiment of the present invention may guide position information on a certain destination (S610).

The moving robot 1 may select a certain menu item or receive a touch input or voice input including a certain keyword, and may determine a guidance destination based on the touch input or voice input.

Alternatively, the moving robot 1 may recognize a ticket inserted through a ticket input port, and may determine the destination based on the recognition result of the ticket.

When a ticket such as an airline ticket, a baggage ticket is inserted into the ticket input port 50, the moving robot 1 may scan a bar code, a QR code, and the like included in the ticket to recognize the information included in the ticket.

The controller 740 may control to display the ticket scan result on the first display 312 and/or the second display 21, and determine a destination corresponding to the ticket scan result, for example, a boarding gate, baggage claim, etc. as a final destination when the user checks.

Meanwhile, the moving robot 1 may display position information related to a certain destination on the first display 312 and/or the second display 21 under the control of the controller 740.

As described with reference to FIGS. 1 to 5, the moving robot 1 may include a first display 312 for receiving a touch input and a second display 21 larger than the first display. More preferably, a guidance information image including the position information may be displayed on the large second display 21.

Figure 7:
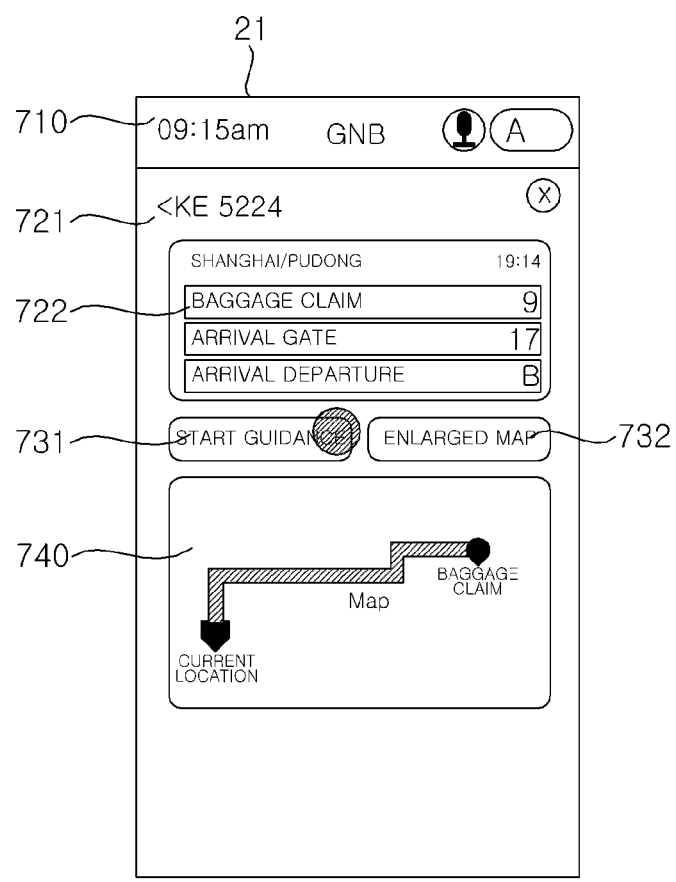
FIGS. 7 to 9B are views for explaining an operating method of a moving robot according to an embodiment of the present invention.

FIG. 7 illustrates a position information guidance screen for guiding a baggage claim corresponding to a specific arrival flight.

Referring to FIG. 7, the controller 740 may control the second display 21 to display a position information screen of a destination corresponding to a user input or an inserted ticket.

For example, when the moving robot 1 is placed in the arrivals hall of airport and a specific flight is inputted, a position information guidance screen may include detailed information 722 such as flight name information 721, baggage claim, arrival gate, exit of arrivals hall.

In addition, the position information guidance screen may include a map image 740 including the current position of a user, the specific destination position, and the destination route that can be guided by the moving robot 1 among the detailed information 722.

In addition, the position information guidance screen may further include an escort menu button 731 for requesting an escort service that the mobile robot 1 moves and guides to a destination displayed on the map image 740, a map enlarging menu button 732 for enlarging and displaying a map in the map image 740, and the like.

Meanwhile, a global navigation bar area 710 in which menu and state information accessible from any screen are displayed may be disposed in the upper end of the second display 21.

Next, when the escort service request of moving and guiding to the destination displayed on the second display 21 is received (S620), the controller 740 determines whether the escort service is available based on the information related to the destination (S630).

For example, when the user selects the escort button 721, the controller 740 may determine the baggage claim number 9 as the guidance destination, and determine whether the escort service is available based on the information related to the baggage claim number 9 (S630).

If the escort service is available, the moving robot 1 may enter the escort mode for providing the escort service of moving and guiding to the destination (S640).

If there is no unusual information in the information related to the destination such as the state information of destination and the route state information to destination, the controller 740 may control the moving robot 1 to enter the escort mode (S640).

Figure 8A:
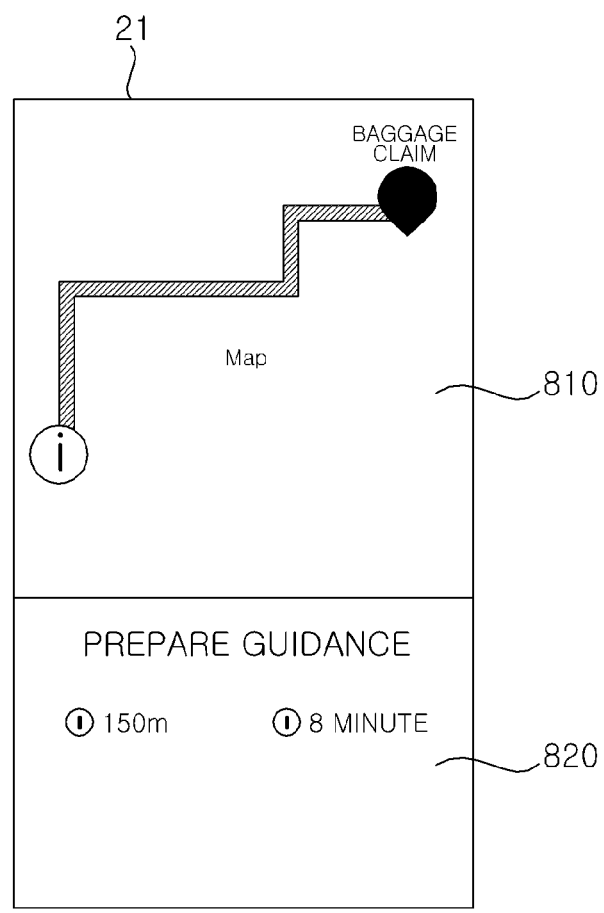

Referring to FIG. 8A, as entering the escort mode, a guidance preparing screen may be displayed on the second display 21.

Referring to FIG. 8A, the guidance preparing screen may include a navigation area 810 in which an enlarged map including the entire route to a destination is displayed, and an information area 820 in which the current state information, and information on the time taken to reach the destination and the distance to the destination.

Figure 8B:
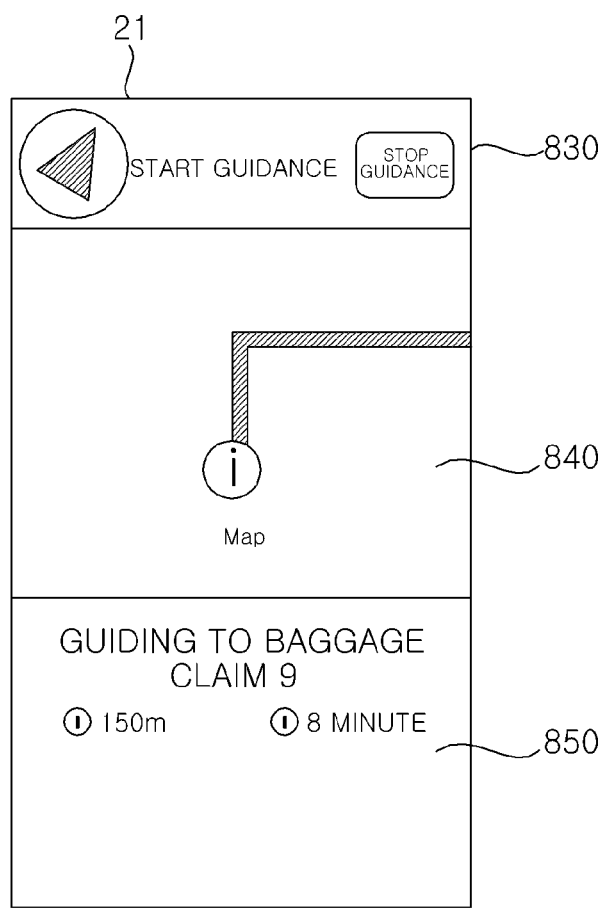

Referring to FIG. 8B, as the escort starts, the escort screen can be displayed on the second display 21.

Referring to FIG. 8B, the escort screen may include a route guidance area 830 that displays moving direction information displayed when there is a direction change, an icon indicating a specific state such as stop, close state, a guidance message, a guidance stop button, and the like.

In addition, the escort screen may include a navigation area 840 that displays the current position and route. Meanwhile, if there is a destination on the map of the scale being displayed, the destination position may also be displayed in the navigation area 840.

In addition, the escort screen may include an information area 850 in which the current state information, and information on the remaining time and distance until the arrival at the destination are displayed.

If it is impossible to provide the escort service, the moving robot 1 may notify that the escort service is not available (S650).

If there is unusual information in the information related to the destination, such as the state information of destination and the route state information to destination, the controller 740 may control the mobile robot 1 not to enter the escort mode but to guide a state in which the escort service is not available (S650).

The moving robot 1 may output the reason why the escort service is not available by using at least one of image and sound, through the display unit 710 and/or the sound output unit 780 (S650).

Figure 9A:
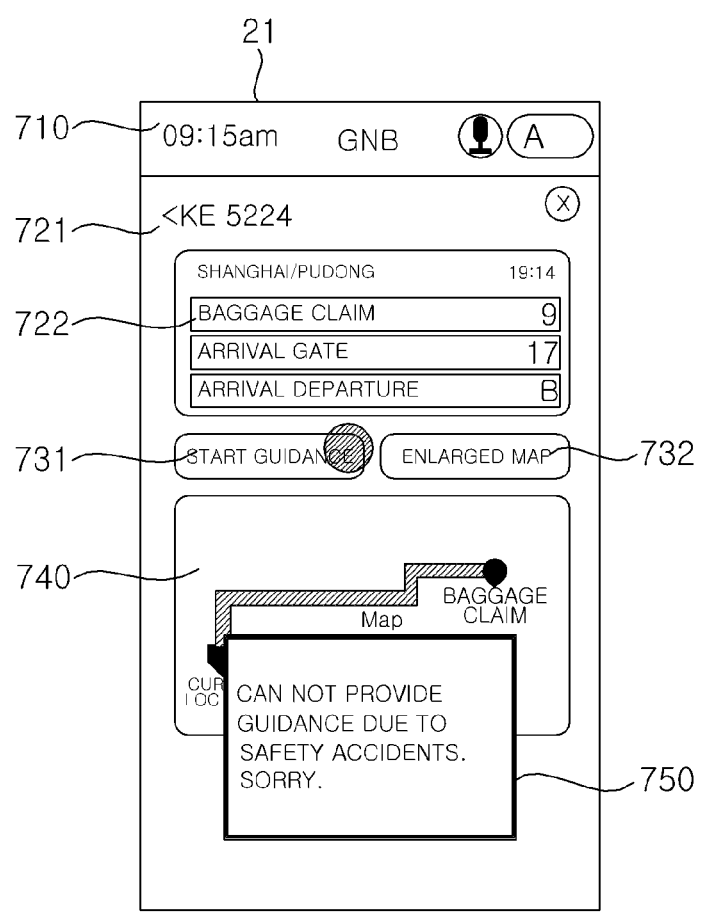

Referring to FIG. 9A, a message 750 indicating that guidance is not available due to a safety incident may be displayed on the second display 21.

The moving robot 1 according to the present invention does not provide the escort service unconditionally, but may determine autonomously whether the escort service is available (S630).

For example, the information related to the destination may be at least one of safety information of the destination, congestion information of the destination, safety information of the route to the destination, and congestion information of the route to the destination.

If there is a safety risk in the destination due to construction or accident, providing an escort service unconditionally will increase the possibility of safety accidents.

In this case, for the sake of safety of the user, it may be desirable not to provide an escort service.

More preferably, providing safety information of the destination, as well as the fact that the escort service is currently impossible due to safety problems may help the user not go to the destination, or to pay attention to safety issues and go directly to the destination.

In addition, even if there is a risk in the route to the destination, it may be desirable not to provide an escort service for the safety of the user. In this case, the user may select a bypass route to the destination.

Further, if the destination and/or the route to the destination is congested, it may be inefficient to receive the guidance of the mobile robot 1 and go to the destination, considering the moving speed of the mobile robot, the time for avoiding collision in a congestion situation, and the like.

Therefore, even in this case, it may be desirable to provide the congestion information on the current destination and the route to the destination to the user, without providing the escort service.

According to an embodiment, the information related to the destination may be state information of the destination.

For example, when the destination is a gate in an airport, the information related to the destination may be boarding state information of the gate.

If the boarding state information of the gate is the state of boarding a certain flight, it may be more effective for the person to move faster than the guidance through the moving robot 1 so as to arrive at the boarding time of the flight.

Figure 9B:
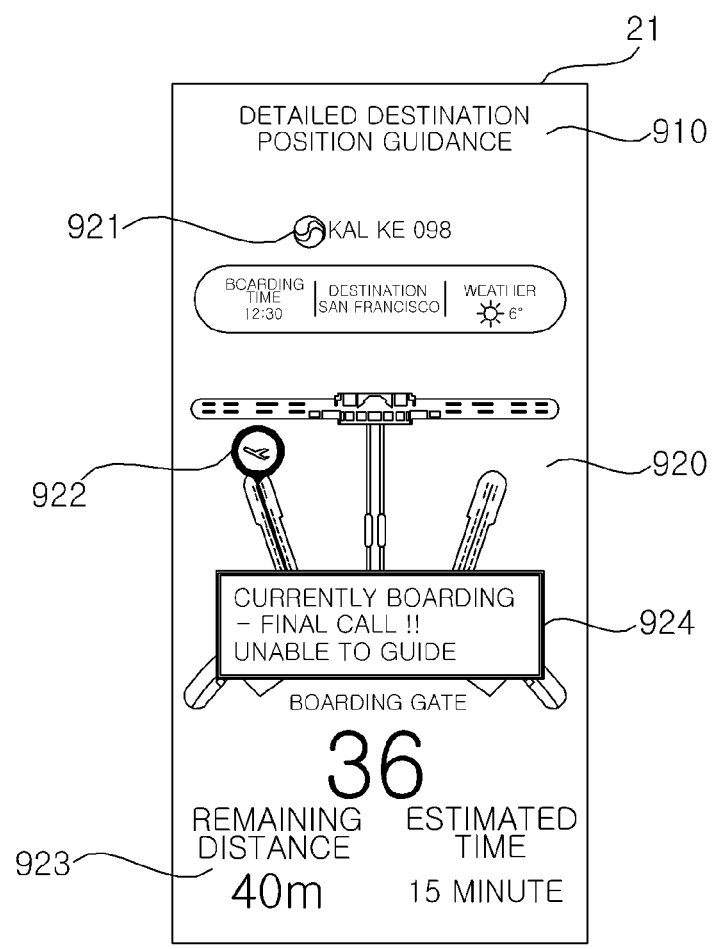

Referring to FIG. 9B, the moving robot 1 may display various guidance information on the second display 21. By displaying various information by using the second display 21 having a large screen, more information may be provided on a single screen, and the user can see the entire map of the airport, so that it is easy to understand the entire route to the destination.

Referring to FIG. 9B, a guide area 910 of the second display 21 may display title information such as 'detailed destination position guidance', or a message for indicating a rotation direction, current position information, a message for guiding a pause, an approach guiding message such as 'follow me', and the like.

In addition, an information area 920 of the second display 21 may display destination or search result information 921, navigation information 922 including a map screen, and guide information 923 such as the remaining distance and estimated time from the current position to the destination at the time of guidance.

Referring to FIG. 9B, a boarding gate '36', which is a destination corresponding to a specific flight, may be displayed in the information area 920. The boarding gate '36' which is a destination may be displayed in the destination or search result information 921 and/or in the navigation information 922.

In the navigation information 922, the current position and the position of the destination may be displayed on the map together with the route.

Meanwhile, if a corresponding flight is in boarding state, particularly, in the final call state at boarding gate '36', the controller 740 may display a message 924, on the second display 21, indicating that guidance is not available in the boarding state, particularly, in the final call state. Unlike FIG. 9B, the mobile robot 1 may guide the user to move quickly without providing an escort service.

As in the conventional case, when the moving robot 1 performs an escort service on the request without any other determination, the escort service may have a negative effect in the case of a specific situation.

For example, in the airport, when the moving robot 1 slowly escorts a passenger whose departure time is at hand to the destination, it adversely affects the boarding of the passengers, and negatively affects the trustworthiness for the guide place, facility, company such as the moving robot, the airport.

Therefore, according to an embodiment of the present invention, the moving robot 1 may receive the destination information of user before the escort service and determine whether to provide the escort service.

For example, the moving robot 1 according to an embodiment of the present invention may determine user ticket information or inputted information, receive information of the boarding gate from a control server, and when the gate is in a final call state or in a check-in state, guide to move quickly without escort.

Meanwhile, depending on the situation, the controller 740 may consider the state information of the destination, the travel time to the destination, and the remaining time.

The travel time to the destination may be calculated based on the average speed information of the moving robot 1 in the escort mode and the distance information to the destination.

In some embodiments, the travel time to the destination may be calculated based on the average speed information of the moving robot 1 in the escort mode, distance information to the destination, and congestion information to the destination.

In some embodiments, when the boarding state information of the gate is in the state of current boarding, the controller 740 may determine to provide the escort service in consideration of the moving speed of the moving robot 1 and the remaining boarding time.

However, even in this case, if it is a final call state in which the non-occupant is finally called by broadcast, it is preferable that the moving robot 1 guides the final call state rather than providing the escort service.

Meanwhile, the moving robot 1 may receive information related to the destination from a certain server through the communication unit 790.

When the moving robot 1 is placed in the airport and provides guidance services, the moving robot 1 may receive information related to the above mentioned destination from a server of the airport operator through the communication unit 790.

The moving robot 1 may receive various types of information according to a certain cycle, and may request specific information to a server, if necessary, and receive a response.

According to an embodiment of the present invention, the controller 740 may classify into a guidable class, a fully impossible class, or a restricted guidable class, according to the state information of the destination.

When it is determined as the guidable class, the controller 740 may control the moving robot 1 to enter the escort mode.

When it is determined as the fully impossible class, the controller 740 may control the moving robot 1 to immediately notify that the escort service is not available.

When it is determined as the restricted guidable class, the controller 740 may control the moving robot 1 to inquire again whether to perform the escort service.

When the detected information is insufficient to deny the provision of the escort service, the controller 740 may determine it as the restricted guidable class.

In this case, the moving robot 1 may notify the user of the current situation by using image and/or sound through the display unit 710 and/or the sound output unit 780, and try to make conversation while asking the user's intention.

For example, when only the gate information is acquired and there are a plurality of flights corresponding to the gate information, the controller 740 may display a plurality of flights corresponding to the gate information on the second display 21, and receive the user's selection input.

In addition, when the current gate state information indicates the state of current boarding, the user may be guided to move quickly, but the escort service may be provided if the user wants to request the escort service again.

Figure 10:
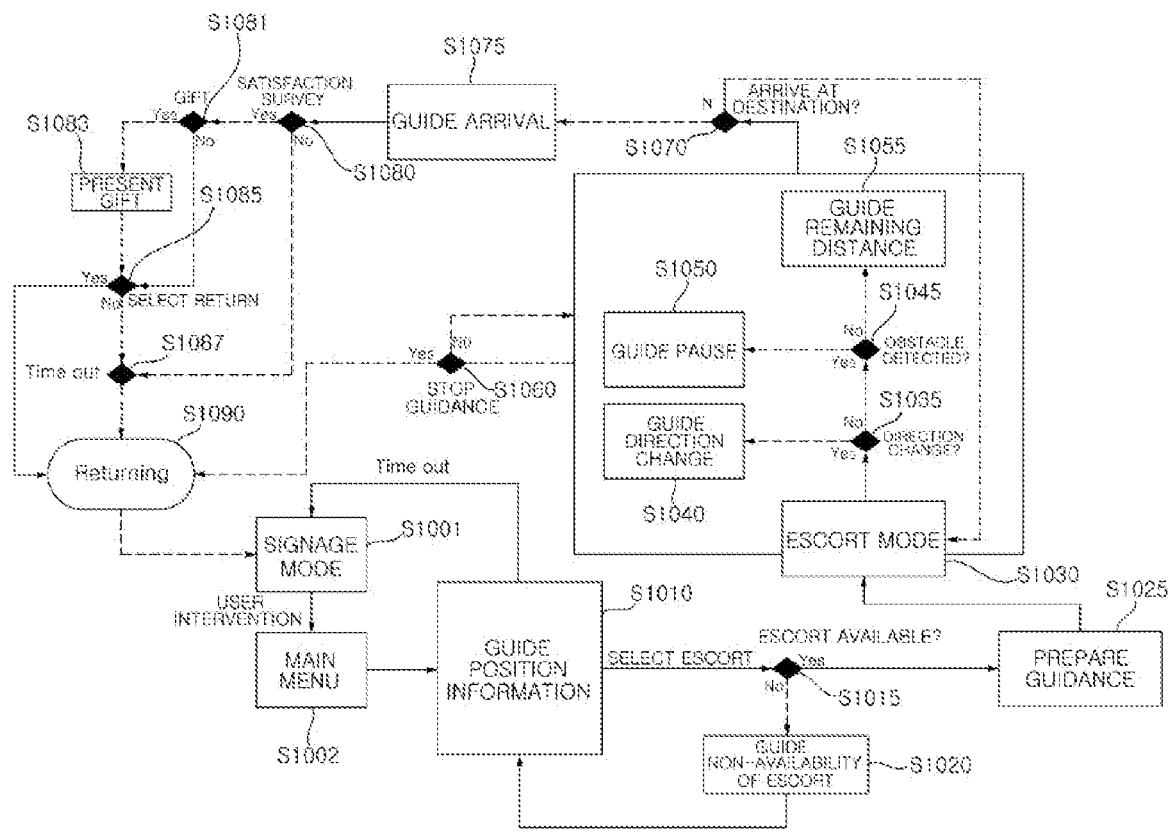
FIG. 10 is a flowchart illustrating an operating method of a moving robot according to an embodiment of the present invention.

FIG. 10 is a flowchart illustrating an operating method of a moving robot according to an embodiment of the present invention.

Referring to FIG. 10, the moving robot 1 may wait in a signage mode in which a standby screen is displayed on the second display 21 while detecting the proximity of a person (S1001).

At this time, if the user enters within a certain distance from the moving robot 1, or there is user intervention such as touch or voice input, the moving robot 1 may display the main menu screen through the display unit 710 (S1002).

The controller 740 may control the first display 312 or the second display 21 to display the main menu screen based on the distance from the user.

Thereafter, if the destination is determined by the voice input, touch input, or ticket input of the user, the controller 740 may provide a screen for guiding the position information of the destination, (S1010).

The screen for guiding the position information of the destination may be provided through at least one of the first display 312 or the second display 21.

When the user requests the escort service, the controller 740 may determine whether the escort service is available (S1015).

If the escort service is available, the controller 740 may control the moving robot 1 to enter the escort mode in which the moving robot 1 moves and guides to the guidance destination (S1030).

In some cases, the controller 740 may prepare the guidance for a certain time, and display the guidance preparing screen on the second display 21 (S1025).

If the moving robot 1 is connected to a charging stand, the moving robot 1 may be separated from the charging stand and prepare for guidance.

According to an embodiment, in the guide preparation step (S1025), the first display 312 may be oriented toward the user, and the second display 21 may be oriented toward the movement direction and move.

In some embodiments, the head is rotated to allow the first display 312 to orient toward the movement direction, and the second display 21 may be oriented rearward so that the user can see from behind.

Meanwhile, as described with reference to FIG. 9, if the escort service is not available, the controller 740 may control the moving robot 1 to guide that the escort service is not available (S1020).

In the escort mode state (S1030), various types of guidance information may be displayed on the display 21, 312 so that the user can safely follow the moving robot 1 while the moving robot 1 moves to the guidance destination.

For example, if there is a direction change (S1035), a screen for guiding the direction change may be displayed on the display 21, 312 (S1040).

In addition, if an obstacle is detected during movement and the moving robot 1 is paused (S1045), a screen for guiding the pause may be displayed on the display 21, 312 (S1050).

In addition, during the movement, guidance information such as the remaining distance to the guidance destination and the remaining time may be displayed on the display 21, 312 (S1055).

Meanwhile, when arriving at the guidance destination (S1070), the moving robot 1 may guide the arrival at destination (S1075).

In this case, photographing, service satisfaction survey (S1080), and the like may be performed according to the user's voice input or touch input (S1080).

According to an embodiment of the present invention, when the moving robot 1 holds a gift such as a card (S1081), it may present the gift (S1083).

Meanwhile, if the user selects guidance end or return (S1085) or if there is no other input for a certain time (S1087), the moving robot 1 may return to home or a preset place (S1090).

Meanwhile, in some cases, during the escort mode (S1030), guidance may be stopped when a user input or a specific event occurs (S1060).

Figure 11:
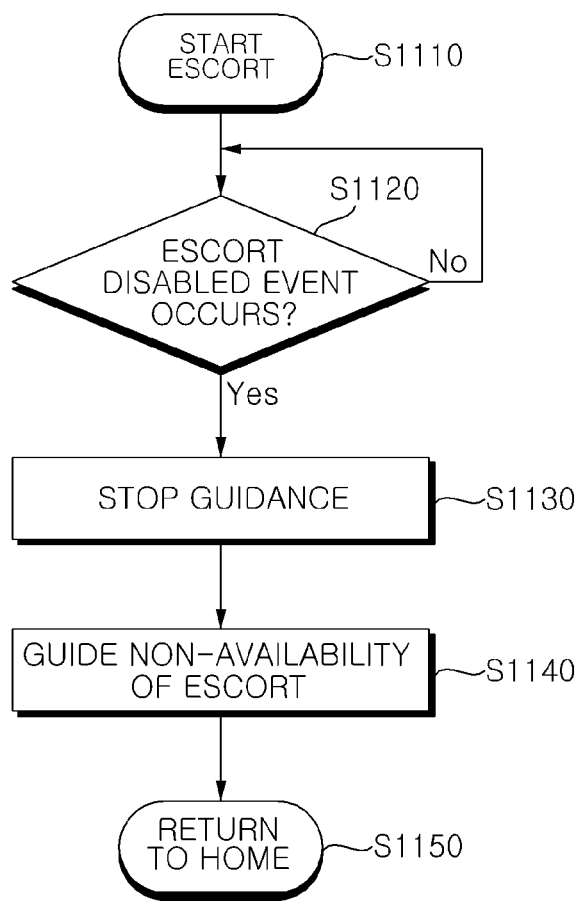
FIG. 11 is a flowchart illustrating an operating method of a moving robot according to an embodiment of the present invention.
Figure 12:
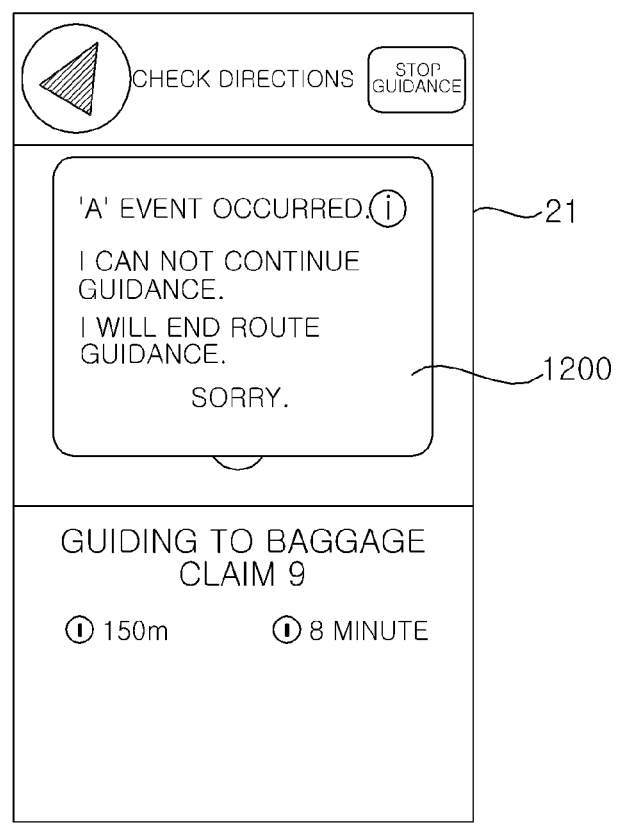
FIG. 12 is a diagram for explaining an operating method of a moving robot according to an embodiment of the present invention.

FIG. 11 is a flowchart illustrating an operating method of a moving robot according to an embodiment of the present invention, and FIG. 12 is a diagram for explaining an operating method of a moving robot according to an embodiment of the present invention.

Referring to FIG. 11, the moving robot 1 may enter the escort mode and start the escorting of guided person (S1110).

In the escort mode (S1110), if a preset escort disabled event occurs in the destination or the route to the destination (S1120), the moving robot 1 may stop the guidance under the control of the controller 740 (S1130), and notify that the escort service is not available (S1140).

Here, as in the embodiment described with reference to FIG. 9, the escort disabled event may be set to be the same as the standard for determining whether the escort service is available before the escort starts.

Therefore, even after the escort is started, if state information set not to provide an escort service is acquired, the moving robot 1 may stop the guidance and guide a corresponding situation to the guided person.

Referring to FIG. 12, a pop-up window 1200 of notifying that the escort service is not available may be outputted on the second display 21.

In some embodiments, the moving robot 1 may stop the guidance (S1130), after guiding that the escort service is not available (S1140).

According to at least one of the embodiments of the present invention, it is possible to determine autonomously whether the escort service is available based on the information related to the guidance destination in the public place.

In addition, according to at least one of the embodiments of the present invention, it is possible to determine whether the escort service is available even in a process of providing a service such as route guidance.

In addition, according to at least one of the embodiments of the present invention, it is possible to provide a guide service in a public place, and to easily provide information displayed on a display in a process of providing a service such as route guidance.

Further, according to at least one of the embodiments of the present invention, information related to the guidance destination can be effectively provided, thereby improving user convenience.

The mobile robot according to the present invention and the operation method for the same are not limited to the configuration and method of the embodiments described above, but the embodiments may be configured in such a manner that all or some of the embodiments may be selectively combined so that various modifications may be accomplished.

Meanwhile, the operation method of the moving robot of the present invention can be implemented as a processor-readable code on a recording medium readable by a processor. The processor-readable recording medium includes all kinds of recording apparatuses in which data that can be read by the processor is stored. Examples of the recording medium readable by the processor include a ROM, a RAM, a CD-ROM, a magnetic tape, a floppy disk, an optical data storage device, and the like, and may also be implemented in the form of a carrier wave such as transmission over the Internet. In addition, the processor-readable recording medium may be distributed over network-connected computer systems so that code readable by the processor in a distributed fashion can be stored and executed.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

What is claimed is:

1. A method for operating a robot, the method comprising:
 displaying position information about a destination on a display of the robot;
 receiving a request for an escort service to the destination in response to the position information;
 determining, by a controller of the robot, whether the escort service is available based on information related to the destination, the information related to the destination comprising at least one of state information of the destination or time information related to the destination;
 causing, by the controller, a main body of the robot to move and provide guiding to the destination in response to the request when the escort service is available; and
 notifying, on the display, that the escort service is not available when the escort service is not available.

2. The method of claim 1, wherein the information related to the destination is at least one of safety information of the destination, congestion information of the destination, safety information of a route to the destination, or congestion information of the route to the destination.

3. The method of claim 1, further comprising receiving the information related to the destination from a server.

4. The method of claim 1, wherein the information related to the destination is the state information of the destination.

5. The method of claim 4, wherein, when the destination is a gate at an airport, the information related to the destination is boarding state information of the gate.

6. The method of claim 1, wherein determining whether the escort service is available based on the information related to the destination comprises determining the escort service as a guidable class, a fully impossible class, or a restricted guidable class according to the state information of the destination.

7. The method of claim 6, further comprising inquiring whether to perform the escort service when the escort service is determined as the restricted guidable class.

8. The method of claim 1, further comprising entering an escort mode to provide the escort service when the escort service is available.

9. The method of claim 8, further comprising notifying that the escort service is not available when a preset escort disabled event occurs at the destination or a route to the destination in the escort mode.

10. The method of claim 1, wherein the display comprises a first display and a second display larger than the first display, and
 wherein the method further comprises:
  receiving a touch input via the first display; and
  displaying an image including the position information about the destination on the second display to provide the position information.

11. The method of claim 1, wherein notifying that the escort service is not available comprises outputting a reason why the escort service is not available through at least one of an image or sound.

12. A robot comprising:
 a voice input unit configured to receive a voice input of a user;
 a display configured to receive a touch input of a user; and
 a controller configured to:
  cause the display to display position information about a destination;
  determine whether an escort service is available based on information related to the destination when a request for the escort service is received through the voice input unit or the display, the information related to the destination comprising at least one of state information of the destination or time information related to the destination;
  cause the robot to move and provide guiding to the destination in response to the request when the escort service is available; and
  notify that the escort service is not available when the escort service is not available.

13. The robot of claim 12, wherein the information related to the destination is at least one of safety information of the destination, congestion information of the destination, safety information of a route to the destination, or congestion information of the route to the destination.

14. The robot of claim 12, further comprising a communication unit configured to receive the information related to the destination from a server.

15. The robot of claim 12, wherein, when the destination is a gate at an airport, the information related to the destination is boarding state information of the gate.

16. The robot of claim 12, wherein the controller is further configured to determine the escort service as a guidable class, a fully impossible class, or a restricted guidable class according to the state information of the destination.

17. The robot of claim 12, wherein the display comprises a first display configured to receive the touch input and a second display larger than the first display,
 wherein an image including the position information of the destination is displayed on the second display.

18. The robot of claim 12, wherein the controller is further configured to cause the display to display a reason why the escort service is not available.

19. The robot of claim 12, further comprising a sound output unit, wherein the controller is further configured to cause the sound output unit to output a voice guidance explaining why the escort service is not available.

* * * * *